United States Patent
Chang et al.

(10) Patent No.: US 10,661,277 B2
(45) Date of Patent: May 26, 2020

(54) MICROFLUIDIC DEVICE AND METHOD OF MAKING THE SAME

(71) Applicant: National Taiwan Normal University, Taipei (TW)

(72) Inventors: Tien-Li Chang, Taipei (TW); Chi-Huang Huang, Taipei (TW); Cheng-Ying Chou, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 224 days.

(21) Appl. No.: 15/795,639

(22) Filed: Oct. 27, 2017

(65) Prior Publication Data
US 2018/0353961 A1 Dec. 13, 2018

(30) Foreign Application Priority Data
Jun. 9, 2017 (TW) .............................. 106119176 A

(51) Int. Cl.
B01L 3/00 (2006.01)
D01D 11/06 (2006.01)
C03C 23/00 (2006.01)
B23K 26/364 (2014.01)
B23K 26/402 (2014.01)
B23K 26/0622 (2014.01)
D01D 5/00 (2006.01)
B23K 103/00 (2006.01)

(52) U.S. Cl.
CPC ... *B01L 3/502761* (2013.01); *B01L 3/502707* (2013.01); *B01L 3/502753* (2013.01); *B23K 26/0624* (2015.10); *B23K 26/364* (2015.10); *B23K 26/402* (2013.01); *C03C 23/0025* (2013.01); *D01D 11/06* (2013.01); *B01L 2200/0668* (2013.01); *B01L 2200/12* (2013.01); *B01L 2300/0896* (2013.01); *B01L 2300/12* (2013.01); *B23K 2103/42* (2018.08); *B23K 2103/54* (2018.08); *D01D 5/003* (2013.01); *D10B 2321/06* (2013.01)

(58) Field of Classification Search
CPC .................................................. B01L 3/502761
USPC ......................................................... 422/503
See application file for complete search history.

(56) References Cited

FOREIGN PATENT DOCUMENTS

CN 102227247 A 10/2011
TW 201426844 A 7/2014

OTHER PUBLICATIONS

Lee et al. "Micropatterned Fibrous Scaffolds Fabricated Using Electrospinning and Hydrogel Lithography: New Platforms to Create Cellular Micropatterns" Sensors and Actuators B 148 (2010) 504-510 (Year: 2010).*

(Continued)

*Primary Examiner* — Christine T Mui
*Assistant Examiner* — Emily R. Berkeley
(74) *Attorney, Agent, or Firm* — Birch, Stewart, Kolasch & Birch, LLP

(57) ABSTRACT

A microfluidic device includes a substrate, a microchannel, a plurality of spaced-apart pillars, and a porous nanofiber structure. The substrate has a substrate top surface. The microchannel is indented downwardly from the substrate top surface. The pillars are disposed in the microchannel. Each of the pillars has a pillar top surface that is lower in level than the substrate top surface. The porous nanofiber web structure is formed in the microchannel, and includes a first web portion residing in a space formed among the pillars.

8 Claims, 4 Drawing Sheets

(56) References Cited

OTHER PUBLICATIONS

Chang et al. "Direct fabrication of nanofiber scaffolds in pillar-based microfluidic device by using electrospinning and picosecond laser pulses" Microelectronic Engineering 177 (2017) 52-58 (Year: 2017).*

Taiwanese Search Report for Taiwanese Application No. 106119176, dated Dec. 27, 2017, with English translation.

* cited by examiner

MICROFLUIDIC DEVICE AND METHOD OF MAKING THE SAME

CROSS-REFERENCE TO RELATED APPLICATION

This application claims priority of Taiwanese Invention Patent Application No. 106119176, filed on Jun. 9, 2017.

FIELD

The disclosure relates to a microfluidic device, and more particularly to a microfluidic device including a microchannel provided with a plurality of pillars and a porous nanofiber web structure, and to a method of making the microfluidic device.

BACKGROUND

Microfluidic chips are widely used in separation and detection system in biomedical engineering, medical and chemical fields, and emphasis has been placed on the technological development of these chips.

Conventional microfluidic chips are available for use in various microfluidic systems. For instance, the microfluidic chip can be used for isolating and analyzing blood samples, wherein different types of blood cells are captured and then detected respectively. One type of conventional microfluidic chip for separating particles from microfluid includes a channel and a plurality of spoiler pillars formed in the channel. With the spoiler pillars, flow rate of the microfluid in the channel is variable and controllable so that particles with different flow rates in the microfluid can be respectively captured in the channel. Another type of conventional microfluidic chip includes a web structure formed in the channel to filter out target particles from the microfluid.

However, the conventional microfluidic chip with the spoiler pillars has a limited capturing area, and thus both the particle-capturing and particle-separating efficiencies are relatively low.

SUMMARY

According to one aspect of the disclosure, the microfluidic device includes a substrate, a microchannel, a plurality of spaced-apart pillars, and a porous nanofiber web structure.

The substrate has a substrate top surface.

The microchannel is indented downwardly from the substrate top surface.

The spaced-apart pillars are disposed in the microchannel. Each of the pillars has a pillar top surface that is lower in level than the substrate top surface.

The porous nanofiber web structure is formed in the microchannel, and includes a first web portion residing in a space formed among the pillars.

According to another aspect of the disclosure, a method of making a microfluidic device includes: ablating a substrate to form a micro-channel and a plurality of spaced-apart pillars disposed in the micro-channel by using an ultrafast laser; and electrospinning a polymer solution to form in the microchannel a porous nanofiber web structure that covers top surfaces of the spaced-part pillars and extends in a space formed among said pillars.

BRIEF DESCRIPTION OF THE DRAWINGS

Other features and advantages of the disclosure will become apparent in the following detailed description of the embodiment with reference to the accompanying drawings, of which.

DETAILED DESCRIPTION

A microfluidic device according to the disclosure is suitable for capturing and separating particles from a microfluidic sample. Microfluidic samples may include medicines, human or animal biofluids such as blood, lymph, saliva, urine, etc. As an example, the microfluidic chip can be used for capturing different types of cells (e.g., fetal nucleated red blood cells (fNRBC) and circulating tumor cells (CTC)), virus, or bacteria from the blood.

Figure 1:
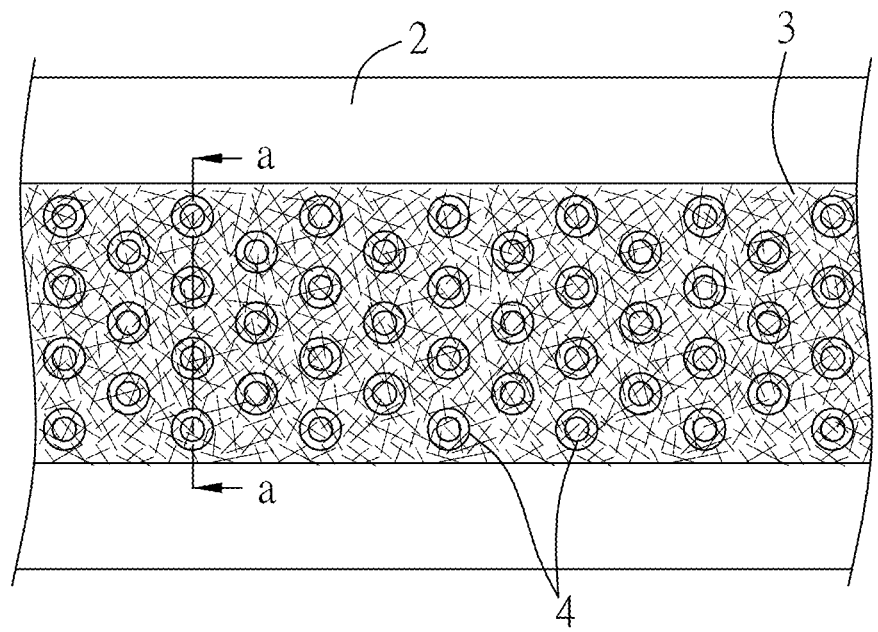
FIG. 1 is a top schematic view illustrating an embodiment of a microfluidic device according to the disclosure.
Figure 2:
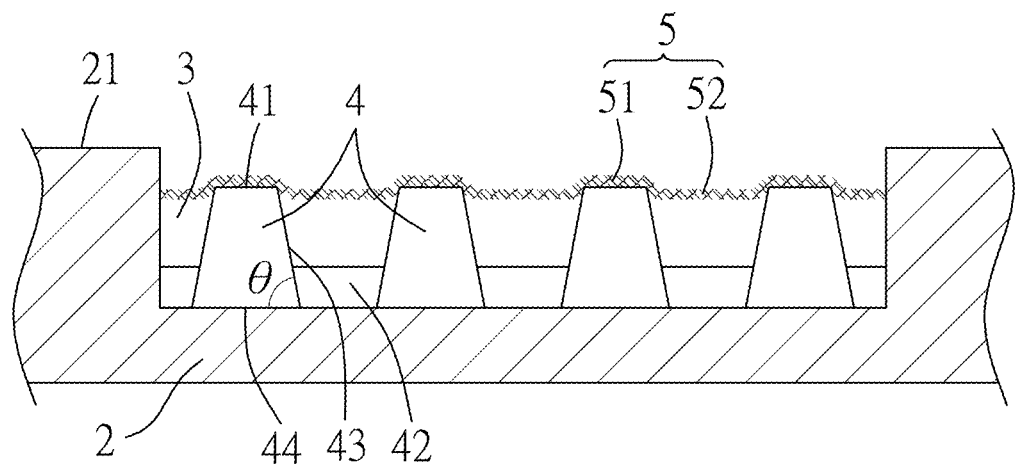
FIG. 2 is a fragmentary cross-sectional schematic view taken along line a-a of FIG. 1.

Referring to FIGS. 1 and 2, an embodiment of the microfluidic device according to the disclosure includes a substrate 2, at least one microchannel 3, a plurality of spaced-apart pillars 4, and a porous nanofiber web structure 5.

The substrate 2 has a substrate top surface 21, and may be made from glass or polymers, such as polymethyl methacrylate (PMMA), polydimethylsiloxane (PDMS), or polycarbonate (PC).

The at least one microchannel 3 is indented downwardly from the substrate top surface 21 of the substrate 2. The at least one microchannel 3 may include one or more microchannels. When the at least one microchannel 3 includes more than one microchannels, the microchannels 3 may be spaced apart from each other or may be in fluid communication with each other. In the embodiment, the at least one microchannel 3 includes one microchannel 3 (as shown in FIG. 1).

In one form, the spaced-apart pillars 4 and the substrate 2 are made from the same materials. The spaced-apart pillars 4 are disposed in the microchannel 3. Each of the pillars 4 has a pillar top surface 41 that may be flush with the substrate top surface 21 of the substrate 2 or may be lower in level than the substrate top surface 21. In the embodiment shown in FIGS. 1 and 2, the pillar top surfaces 41 of the pillars 4 are lower in level than the substrate top surface 21. In one form, the pillars 4 are independently cubical, frusto-conical, frusto-pyramidal, or cylindrical in shape. The pillars 4 are arranged in a plurality of rows that are transverse to a longwise direction of the microchannel 3. The pillars 4 of each of the rows are staggered relative to the pillars 4 of an adjacent one of the rows.

The porous nanofiber web structure 5 is formed in the microchannel 3 and includes a first web portion 51 residing in a space 42 formed among the pillars 4, and a plurality of second web portions 52 formed on the pillar top surfaces 41.

The first web portion 51 is lower in level than the second web portions 52. In one form, the porous nanofiber web structure 5 may be made by interlacing and laminating nanofibers. In one form, the porous nanofiber web structure 5 may be made from hydrophilic materials or hydrophobic materials. For example, the porous nanofiber web structure 5 may be made from one of polyvinyl alcohol (PVA), polyoxyethylene (POE), polycaprolactone (PCL), polyacrylonitrile (PAN), poly(methyl methacrylate) (PMMA), and polystyrene (PS), etc. In one form, the porous nanofiber web structure 5 may have a polarity similar to that of the microfluidic sample.

The porous nanofiber web structure 5 is a continuous nanofiber web supported by the pillars 4 and has an average pore area ranging from 8 μm$^2$ to 25 μm$^2$.

In one form, the microchannel 3 has a width ranging from 3 mm to 10 mm. The pillar top surface 41 of each of the pillars 4 has a maximum length ranging from 300 μm to 1000 μm. Each of the pillars 4 has a height ranging from 300 μm to 1000 μm.

In one form, the height of each of the pillars 4 is greater than the maximum length of the pillar top surface 41.

In one form, a maximum distance from one of the pillars 4 to an adjacent one of the pillars 4 is not greater than 2000 μm.

In one form, the porous nanofiber web structure 5 is a continuous nanofiber web supported by the pillars 4.

During the operation of the microfluidic device, the microfluidic sample is first introduced to one end of the microchannel 3, and then flows along the longwise direction of the microchannel 3. By virtue of an uneven surface of the continuous nanofiber web formed by the first and second web portions 51, 52 of the porous nanofiber web structure 5 supported by the pillars 4, the flow of the microfluidic sample in the microchannel 3 will be disturbed when the microfluidic sample passes through the uneven surface of the porous nanofiber web structure 5. Thus, the microfluidic sample tends to pass through different regions of the microchannels 3 at different flow rates, and the contact area between the particles and the porous nanofiber web structure 5 is increased. Thus, particles in the microfluidic sample with different properties, such as different sizes or weights, can be efficiently captured by the pores of various sizes in the porous nanofiber web structure 5.

It is worth noting that the pore size of the porous nanofiber web structure 5 is adjustable on the size of the particles of the microfluidic sample. For example, the pore size of the porous nanofiber web structure 5 may be adjusted to become larger than that of the particles intended to be separated, and then the particles intended to be separated can pass through the pores efficiently for facilitating the separation process. In case that the microfluidic sample is blood and the particles intended to be separated are erythrocytes, the pore size of the porous nanofiber web structure 5 may be adjusted to range from 8 μm$^2$ to 50 μm$^2$ for separating the erythrocytes from the blood.

In order to increase the contact area of the porous nanofiber web structure 5 and the microfluidic sample, the space 42 among the pillars 4 can be enlarged so that the proportion of the first web portion 51 in the porous nanofiber web structure 5 is increased. Therefore, the separating efficiency of the microfluidic device can be enhanced. In one form, each of the pillars 4 further has a pillar bottom side 44 that is opposite to the pillar top surface 41, and a pillar lateral side 43 that interconnects the pillar top surface 41 and the pillar bottom side 44 and that forms an included angle (θ) with the pillar bottom side 44. The included angle (θ) complies with the formula: θ≤90°. When the pillar bottom sides 44 of any two adjacent ones of the pillars 4 are separated by a fixed distance, the included angle (θ) can be adjusted to control the distance of the pillar top surfaces 41 of the two adjacent pillars 4. When the included angle (θ) complies with the formula: θ<90°, the pillar top surfaces 41 of the adjacent two pillars 4 are separated from each other by a relatively large distance, the proportion of the first web portions 51 of the porous nanofiber web structure 5 is relatively large. More specifically, the included angle (θ) complies with the formula: 30°≤θ≤90°.

In the following, an embodiment of a method of making the microfluidic device of the disclosure is illustrated.

First, the substrate 2 is ablated from the substrate top surface 21 by downward indentation to remove an unnecessary portion so as to form the microchannel 3 and the spaced-apart pillars 4 disposed in the microchannel 3 by using an ultrafast laser. More specifically, the ultrafast laser is an ultrafast pulsed laser, such as a picosecond laser, a femtosecond laser, etc. The ultrafast pulsed laser has a wavelength range from ultraviolet (UV) to infrared (IR).

Figure 3:
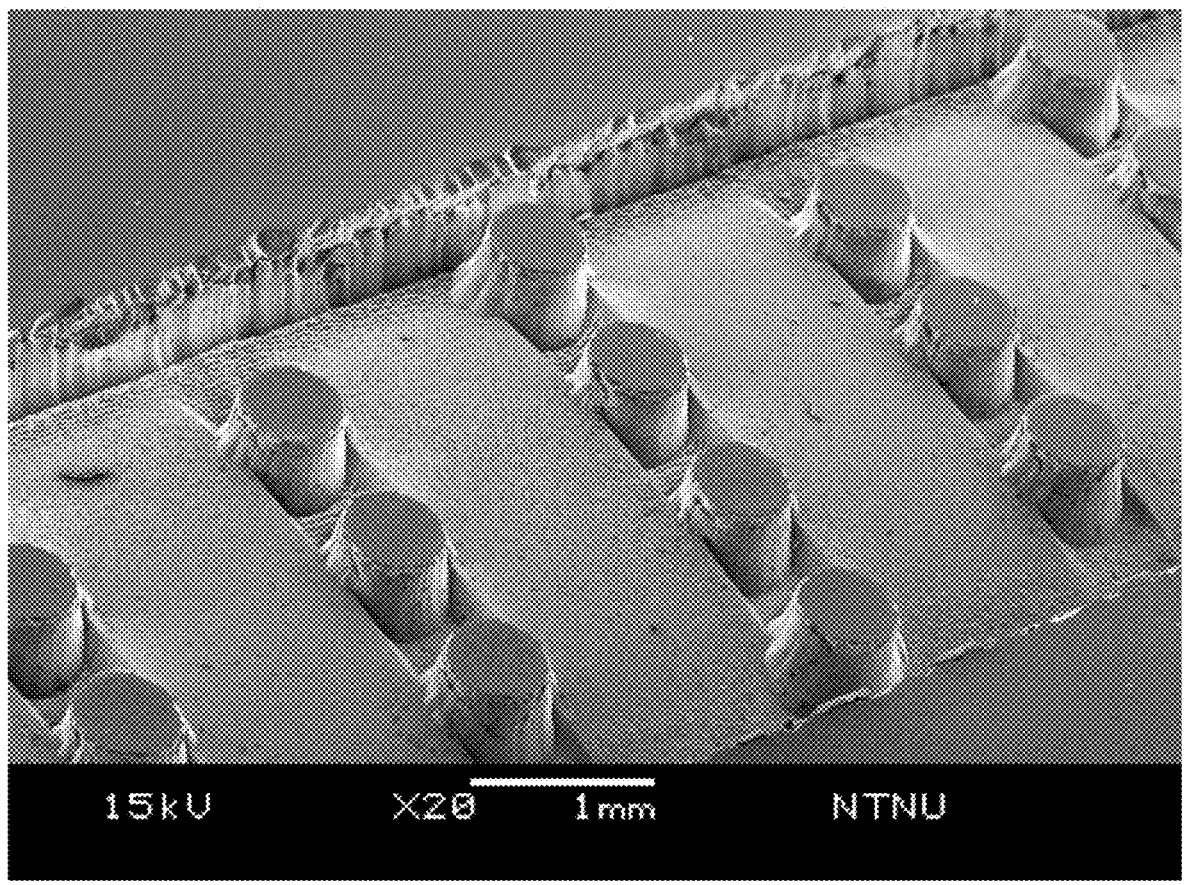
FIG. 3 is a scanning electron microscope (SEM) image of a preformed microfluidic device that has been subjected to an ablation process according to the disclosure.

In the embodiment, the substrate is made from glass. The ultrafast pulsed laser has a wavelength ranging from the third harmonic to 355 nm, a high-pulse repetition rate of 200 kHz, and a pulse duration of 15 ps. A depth and the width of the microchannel 3 formed in the glass substrate 2 and the size of the pillars 4 may be controlled by an ablating rate of the ultrafast pulsed laser. Referring to FIG. 3, a SEM image of a preformed microfluidic device that has been subjected to the ablating process is shown. Since the ultrafast pulsed laser has a laser pulse width in a femtosecond level, regions of the ablated regions of the glass substrate 2 will exhibit a relatively high power density and a relatively small thermal effect due to this superfine machining process. Thus, a high precision of the ablating step is obtained. The image of FIG. 3 shows that there is no molten area on the outer surfaces of the pillars 4 and the microchannel 3, indicating that thermal damage was prevented during the ablating process of the glass substrate 2. Hence, the size and morphology of the pillars 4 and the microchannel 3 can be controlled precisely.

Then, a polymer solution is electrospinned to form the porous nanofiber web structure 5 in the microchannel 3. The porous nanofiber web structure 5 covers the pillar top surfaces 41 of the spaced-apart pillars 4 and extends in the space 42 formed among the pillars 4.

The polymer solution may include a polymer selected from polyvinyl alcohol (PVA), polyoxyethylene (POE), polycaprolactone (PCL), polyacrylonitrile (PAN), poly(methyl methacrylate) (PMMA), and polystyrene (PS), etc. In the embodiment, the polymer solution is an aqueous solution of polyvinyl alcohol and has an average molecular weight ranging from 84000 to 89000.

Figure 4:
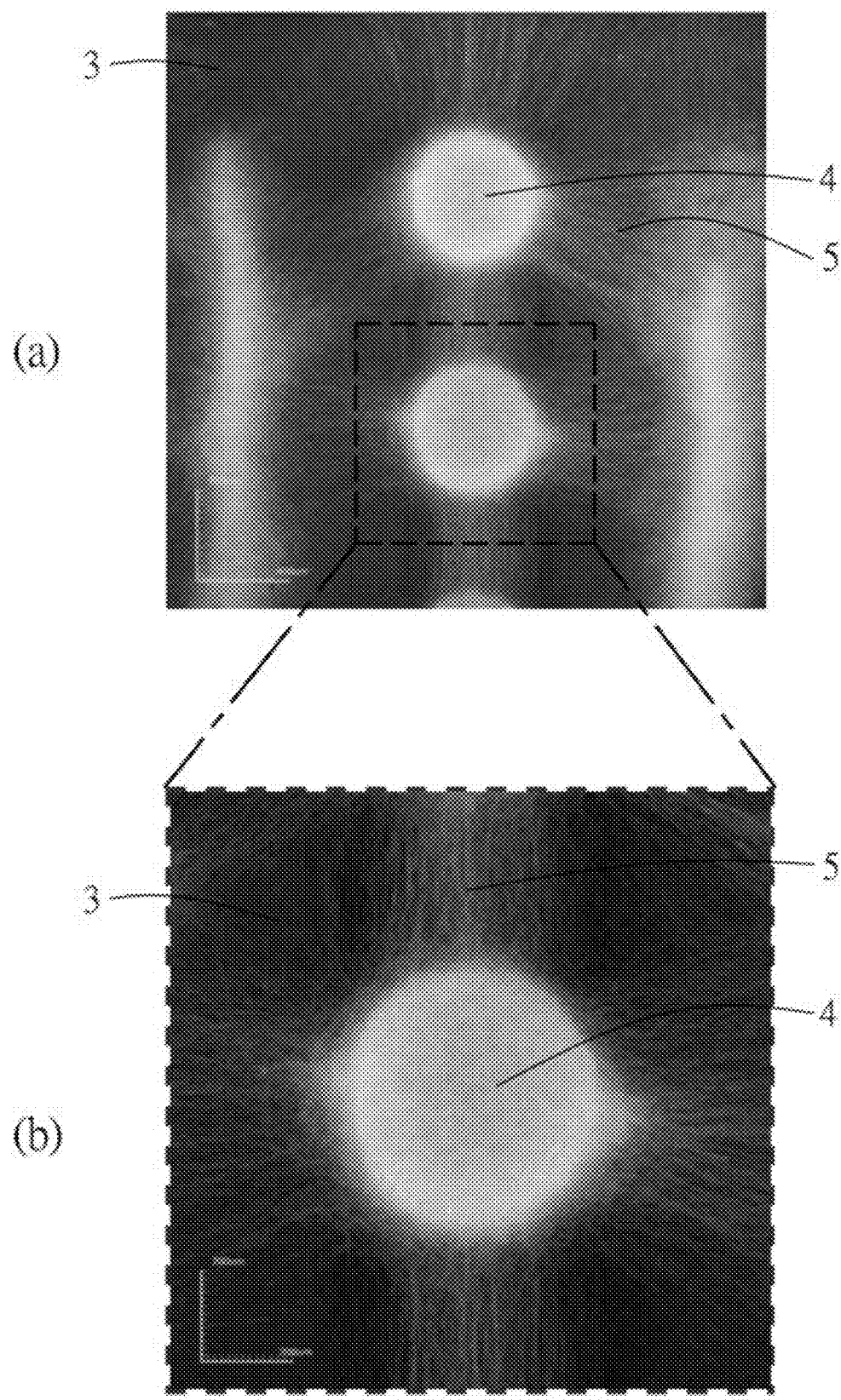
FIG. 4 is a laser scanning confocal microscopy image illustrating the microfluidic device after subjecting the preformed microfluidic device of FIG. 3 to an electrospinning process according to the disclosure.

More specifically, electrospinning of the polymer solution is conducted by applying a predetermined voltage to the polymer solution, followed by spraying the charged polymer solution thus formed, which has a predetermined weight percent concentration, from a nozzle so as to form the porous nanofiber web structure 5 that is composed of the interlaced and laminated nanofibers in the microchannel 3 and that covers the pillars 4 and the space 42 formed among the pillars 4. Since the related operating parameters of the electrospinning of the polymer solution are well known and can be adjusted by those skilled in the art based on the species and concentration of the polymer contained in the polymer solution, further details thereof are not provided herein for the sake of brevity. In the embodiment, during the electrospinning of the polymer solution, the substrate 2 formed with the microchannel 3 is first disposed on an aluminum collecting plate spaced apart from the nozzle by a distance of 16 cm, followed by electrospinning the polymer solution under conditions that a flow rate of the polymer solution is 2.5 µL/hr and that a positive voltage is 18 kV. Referring to FIG. 4, a laser scanning confocal microscopy (LSCM) image of the porous nanofiber web structure 5 formed in the microchannel 3 is shown. The image shows that the porous nanofiber web structure 5 is a continuous nanofiber web supported by the pillars 4.

Figure 5:
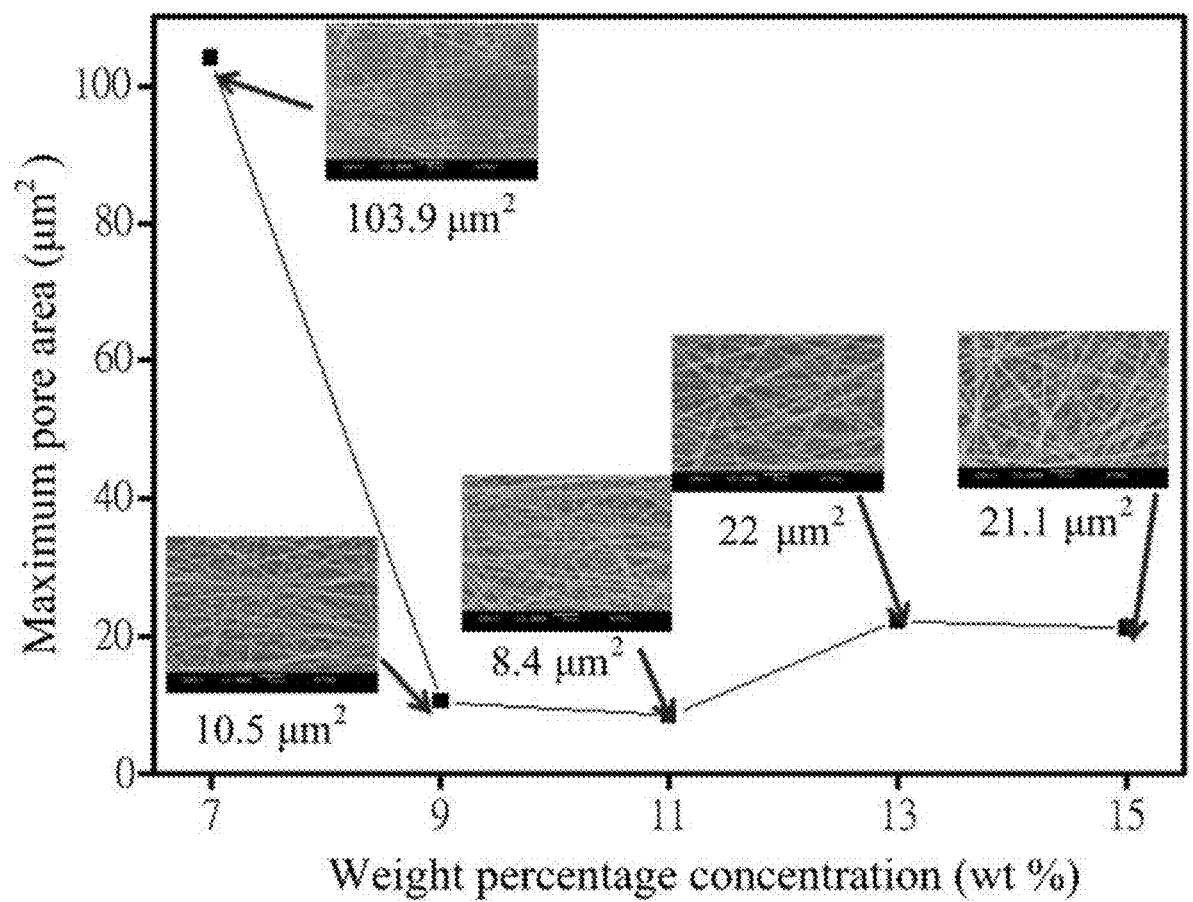
FIG. 5 is a plot showing the maximum-pore-area profile of porous web nanofiber structures formed by polymer solutions with different weight percentage concentrations.

FIG. 5 is a plot showing a relationship between the maximum pore area of the porous nanofiber web structure 5 and the weight percentage concentration of the polymer solution under predetermined electrospinning process conditions. In the measurement, the polymer solution is a PVA solution. The result shows that when the weight percent concentration of the polymer solution is relatively low (e.g., the weight percent concentration of the PVA solution is lower than 9 wt %), the pore area of the porous nanofiber web structure 5 will be relatively large due to less nanofiber production. When the polymer solution has a desired weight percent concentration (e.g., the weight percent concentration of the PVA solution ranges between 9 wt % to 11 wt %), the porous nanofiber web structure 5 will be relatively dense, and thus the pore area thereof is relatively small. When the weight percent concentration of the polymer solution is relatively high (e.g., the weight percent concentration of the PVA solution is higher than 15 wt %), the pore area of the porous nanofiber web structure 5 will be relatively large due to an increase in the viscosity of the polymer solution. These results indicate that the pore area of the porous nanofiber web structure 5 is adjustable by changing the weight percent concentration of the polymer solution.

To sum up, by virtue of the porous nanofiber web structure 5 supported by the pillars 4 and the uneven top surface of the continuous nanofiber web formed by the first and second web portions 51, 52 of the porous nanofiber web structure 5 supported by the pillars 4, the flow of the microfluidic sample in the microchannel 3 will be disturbed when the microfluidic sample passes through the uneven surface of the porous nanofiber web structure 5, allowing the microfluidic sample to pass through different regions of the microchannels 3 at different flow rates. Thus, the contact area between the particles and the porous nanofiber web structure 5 is increased and particles in the microfluidic sample with different properties, such as different particle sizes or different particle weights, can be captured efficiently by the pores of various pore sizes in the porous nanofiber web structure 5. Therefore, the efficiency of separating the particles from the microfluidic sample is improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A microfluidic device, comprising:
   a substrate having a substrate top surface;
   a microchannel indented downwardly from said substrate top surface;
   a plurality of spaced-apart pillars disposed in said microchannel, each of said pillars having a pillar top surface that is lower in level than said substrate top surface; and
   a porous nanofiber web structure formed in said microchannel, and including a first web portion residing in a space formed among said pillars and a plurality of second web portions formed on said pillar top surfaces, said first web portion being lower in level than said second web portions.

2. The microfluidic device of claim 1, wherein said porous nanofiber web structure is a continuous nanofiber web supported by said pillars and has an average pore area ranging from 8 µm² to 25 µm².

3. The microfluidic device of claim 1, wherein each of said pillars is cubical, frusto-conical or cylindrical in shape.

4. The microfluidic device of claim 1, wherein a maximum distance of each of said pillars from an adjacent one of said pillars is not greater than 2000 µm.

5. The microfluidic device of claim 1, wherein said substrate is made from a material selected from glass and polymers.

6. The microfluidic device of claim 1, wherein said porous nanofiber web structure is made from a material selected from polyvinyl alcohol, polyoxyethylene, polycaprolactone, polyacrylo-nitrile, poly(methyl acrylate), and polystyrene.

7. The microfluidic device of claim 1, wherein each of said pillars further has a pillar bottom side that is opposite to said pillar top surface, and a pillar lateral side that interconnects said pillar top surface and said pillar bottom side and that forms an included angle (θ) with said pillar bottom side, and wherein the included angle (θ) complies with the formula: $30 \leq \theta \leq 90°$.

8. The microfluidic device of claim 1, wherein said pillars are arranged in a plurality of rows transverse to a longwise direction of said microchannel, said pillars of each of said rows being staggered relative to said pillars of an adjacent one of said rows.

* * * * *